(12) United States Patent
Li et al.

(10) Patent No.: US 10,094,256 B2
(45) Date of Patent: Oct. 9, 2018

(54) OIL-GAS SEPARATOR ASSEMBLY AND INTERNAL COMBUSTION ENGINE

(71) Applicant: WEICHAI POWER CO., LTD., Weifang, Shandong (CN)

(72) Inventors: Chunfeng Li, Shandong (CN); Jiawei Shen, Shandong (CN); Nan Li, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 95 days.

(21) Appl. No.: 15/389,552

(22) Filed: Dec. 23, 2016

(65) Prior Publication Data

US 2018/0058281 A1    Mar. 1, 2018

(30) Foreign Application Priority Data

Aug. 25, 2016   (CN) .......................... 2016 1 0726139

(51) Int. Cl.
  *B01D 46/00*   (2006.01)
  *F01M 13/04*   (2006.01)
  *B01D 46/44*   (2006.01)

(52) U.S. Cl.
  CPC ......... *F01M 13/04* (2013.01); *B01D 46/0036* (2013.01); *B01D 46/446* (2013.01); *F01M 2013/0422* (2013.01)

(58) Field of Classification Search
  CPC .. B01D 46/00; B01D 46/0036; B01D 46/446; F01M 13/004; F01M 13/0405; F01M 2013/0422–2013/0427; F01M 2013/0438
  USPC .................................................... 55/315–337
  See application file for complete search history.

(56) References Cited

U.S. PATENT DOCUMENTS

| 6,033,450 A | 3/2000 | Krul et al. |
| 2007/0163215 A1* | 7/2007 | Lagerstadt ................ B04B 5/12 55/406 |

FOREIGN PATENT DOCUMENTS

| CN | 203308546 U | 11/2013 |
| CN | 104131860 A | 11/2014 |
| CN | 204591400 U | 8/2015 |
| CN | 205206905 U | 5/2016 |

(Continued)

OTHER PUBLICATIONS

SIPO Summary of the First Office Action for corresponding CN Application No. 201610726139.3; dated Mar. 12, 2018.

*Primary Examiner* — T. Bennett McKenzie
(74) *Attorney, Agent, or Firm* — Cantor Colburn LLP

(57) ABSTRACT

An oil-gas separator assembly is provided, which includes a rotating separating section and a stationary filtering section. The rotating separating section includes: a rotating member provided with a through hole for an oil-gas mixture passing through; a rotating skeleton fixedly arranged at an outer side of the rotating member, wherein a rotating filter element is provided in the rotating skeleton for being rotated along with the rotating skeleton; a connecting pipe fixedly connected to an inner side of the rotating member; and a rotating impeller fixedly connected to the rotating member and located in the connecting pipe, wherein the rotating impeller is used for suctioning the oil-gas mixture into the oil-gas separator assembly. The stationary filtering section includes: a housing fitted with the connecting pipe; a stationary skeleton; and a vent hole provided on the housing, and an oil discharging hole provided at the bottom of the housing.

17 Claims, 1 Drawing Sheet

(56) References Cited

FOREIGN PATENT DOCUMENTS

| | | |
|---|---|---|
| DE | 102011016893 A1 | 10/2012 |
| EP | 2383029 A1 | 11/2011 |
| FR | 2933626 A1 | 1/2010 |
| JP | 2009121341 A | 6/2009 |
| KR | 20060063069 A | 6/2006 |

\* cited by examiner

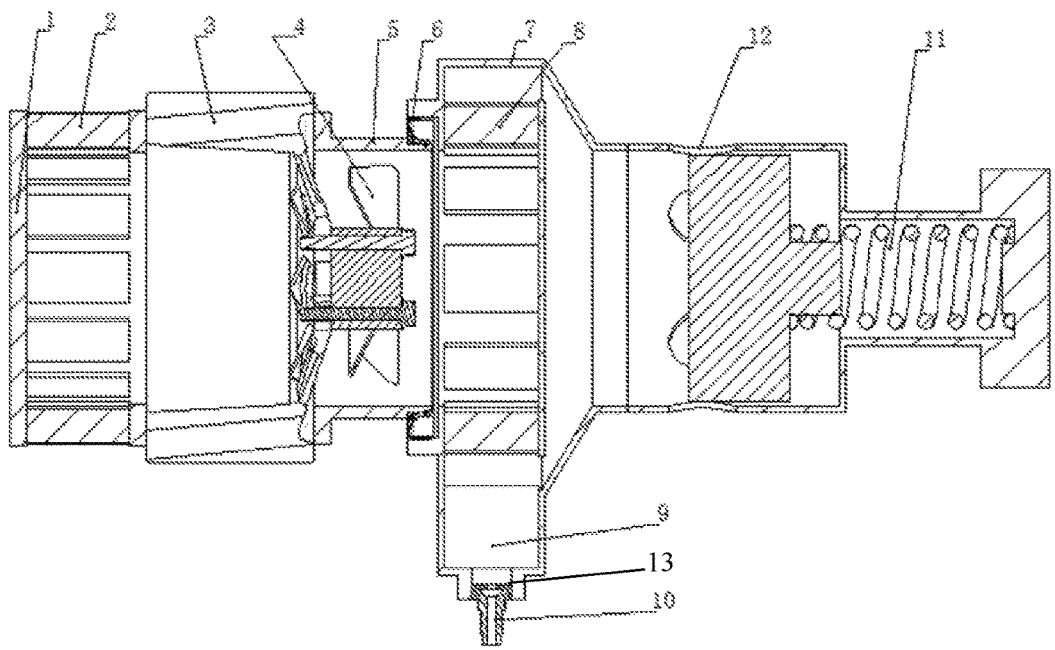

OIL-GAS SEPARATOR ASSEMBLY AND INTERNAL COMBUSTION ENGINE

CROSS-REFERENCE TO RELATED APPLICATIONS

The present application claims the benefit of priority to Chinese patent application No. 201610726139.3 titled "OIL-GAS SEPARATOR ASSEMBLY AND INTERNAL COMBUSTION ENGINE", filed with the Chinese State Intellectual Property Office on Aug. 25, 2016, the entire disclosure of which is incorporated herein by reference.

FIELD

This application relates to the technical field of internal combustion engine production, and particularly to an oil-gas separator assembly and an internal combustion engine.

BACKGROUND

In the operation of an internal combustion engine, a part of gases in a combustion chamber may enter a crankcase via a gap between a piston ring and a cylinder liner. This part of gases contains lubricating oil mist and combustion products produced from the combustion in the combustion chamber.

In order to reduce a rate of oil consumption and exhaust clean emissions, oil is required to be separated from the gases when the gases entered the crankcase. A common oil-gas separator employed in an internal combustion engine is relatively simple, which generally includes a housing and a stationary filter element disposed in the housing. After an oil-gas mixture enters the oil-gas separator, an oil droplet is absorbed by the filter element, and gas is discharged from the housing after passing through the filter element.

As is well known, for pursuing a high oil-gas separating rate, resistance provided by the filter element is required to be increased, however, this may cause an increased pressure in the crankcase, which is apt to cause oil leakage of the crankcase. Further, since all oil droplets in the oil-gas mixture are absorbed onto the stationary filter element, the stationary filter element has a short service life, which is required to be replaced frequently.

Therefore, a technical issue to be addressed by the person skilled in the art presently is to enhance oil-gas separating effect while not increasing pressure of the gas in the crankcase, and improve service life of the filter element.

SUMMARY

An oil-gas separator assembly is provided according to the present application, which enhances oil-gas separation effect while not increasing gas pressure in a crankcase, and prolongs service life of a filter element.

An internal combustion engine having the oil-gas separator assembly is further provided by the present application.

The oil-gas separator assembly according to the present application includes a rotating separating section and a stationary filtering section,
wherein the rotating separating section includes:
a rotating member provided with a through hole for an oil-gas mixture passing through;
a rotating skeleton fixedly arranged at an outer side of the rotating member, and a rotating filter element is provided in the rotating skeleton for being rotated along with the rotating skeleton;
a connecting pipe fixedly connected to an inner side of the rotating member; and
a rotating impeller fixedly connected to the rotating member and located in the connecting pipe, wherein the rotating impeller is provided for suctioning the oil-gas mixture into the oil-gas separator assembly and allowing the oil-gas mixture to pass through the oil-gas separator assembly, and
the stationary filtering section includes:
a housing fitted with the connecting pipe in a sealed manner;
a stationary skeleton arranged in the housing, wherein a stationary filter element is provided in the stationary skeleton; and
a vent hole provided on the housing, and an oil discharging hole provided at the bottom of the housing.

Preferably, multiple stationary skeletons are provided in the stationary filtering section, and the stationary skeleton filter element is provided in each of the stationary skeletons.

Preferably, the vent hole is arranged at an upper part of the housing.

Preferably, the oil-gas separator assembly further includes a pressure regulating valve arranged on the housing for regulating the gas pressure in the housing and maintaining the gas pressure in the housing within a predetermined range.

Preferably, the oil discharging hole is arranged right below the stationary skeleton.

Preferably, an oil groove for temporarily storing lubricating oil is provided between the stationary skeleton and the oil discharging hole.

Preferably, the oil-gas separator assembly further includes a one-way valve arranged at the oil discharging hole, which simply allows oil liquid to flow out of the oil discharging hole.

Preferably, the connecting pipe is fitted with the housing in a sealed manner by a skeleton oil seal.

An internal combustion engine according to the present application is provided with an oil-gas separator assembly in communication with a crankcase, and the oil-gas separator assembly is the oil-gas separator assembly according to any one of the above items.

Preferably, the oil-gas separator assembly is arranged in a gearbox of the internal combustion engine, and the rotating member is a gear in the gearbox.

The working principle of the oil-gas separator assembly according to the present application is as follows.

The oil absorption process is that: the rotating skeleton, the rotating filter element, the connecting pipe and the rotating impeller are rotated synchronously as the rotating member rotates. Under the action of the rotating impeller, a negative pressure will be generated in the oil-gas separator assembly, and the oil-gas mixture will enter the oil-gas separator assembly from an end of the rotating skeleton. Large oil droplets in the oil-gas mixture will be absorbed by the rotating filter element first, and then the oil-gas mixture passes through the through hole in the rotating member and then keeps moving on till reaching the stationary filtering section. Small oil droplets in the oil-gas mixture will be absorbed by the stationary filter element, and the residual clean gas will be discharged from the vent hole.

The oil flowing back process is that: the rotating filter element throws away the oil absorbed therein by a centrifugal force generated by the rotation, and this part of oil will flow, in a manner of splashing, back to the oil pan. The stationary filter element discharges the separated oil droplets to the oil pan via the oil discharging hole.

Since the rotating impeller generates the negative pressure during rotation, the oil-gas mixture is suctioned into the oil-gas assembly, and the negative pressure generated by the rotation of the impeller sufficiently overcomes the resistances provided by the rotating separating section and the stationary filtering section, which may therefore not cause an increased gas pressure in the crankcase, thereby effectively avoiding oil leakage of the crankcase. Further, a multi-stage combination of the rotating separating and the stationary filtering also makes the effect of oil-gas separation better. The rotating filter element may throw away the absorbed lubricating oil under the action of the centrifugal force, and then achieves self-cleaning. The stationary filter element is arranged downstream of the rotating filter element, and absorbs a small amount of lubricating oil, thus the two filter elements are not required to be replaced frequently. Therefore, the oil-gas separator according to the present application effectively prolongs the service life of the filter element.

BRIEF DESCRIPTION OF THE DRAWINGS

FIG. 1 is a schematic view showing the structure of an oil-gas separator assembly according to an embodiment of the present application.

REFERENCE NUMERALS IN THE DRAWINGS

| | |
|---|---|
| 1 rotating skeleton, | 2 rotating filter element, |
| 3 rotating member, | 4 rotating impeller, |
| 5 connecting pipe, | 6 skeleton oil seal, |
| 7 housing | 8 stationary skeleton, |
| 9 oil groove, | 10 one-way valve, |
| 11 pressure regulating valve, | 12 vent hole, and |
| 13 oil discharging hole. | |

DETAILED DESCRIPTION

An oil-gas separator assembly is provided according to the present application, which enhances oil-gas separating effect while not increasing gas pressure in a crankcase, and prolongs the service life of a filter element.

An internal combustion engine having the oil-gas separator assembly is further provided according to the present application.

For making the person skilled in the art better understand the technical solution of the present application, the present application is further described in detail with reference to the drawings and embodiments.

Reference is made to FIG. 1, which is a schematic view showing the structure of an oil-gas separator assembly according to an embodiment of the present application.

The oil-gas separator assembly according to the present application includes a rotating separating section and a stationary filtering section. The rotating separating section includes a rotating member 3, a rotating skeleton 1, a rotating filter element 2, a connecting pipe 5 and a rotating impeller 4, as shown in FIG. 1. The rotating member 3 is provided with a through hole for an oil-gas mixture passing through. The rotating skeleton 1 is fixedly arranged at an outer side of the rotating member 3. The rotating filter element 2 is arranged in the rotating skeleton 1, and is rotated synchronously as the skeleton 1 rotates. The connecting pipe 5 is fixedly connected to an inner side of the rotating member 3. The rotating impeller 4 is located in the connecting pipe 5, and the rotating impeller 4 is also fixedly connected to the rotating member 3, which is used for suctioning an oil-gas mixture into the separator assembly and allowing the oil-gas mixture to pass through the oil-gas separator assembly. The stationary filtering section includes a housing 7, a stationary skeleton 8 and a stationary filter element. The housing 7 is fitted with the connecting pipe 5 in a sealed manner. The stationary skeleton 8 is arranged in the housing 7, and the stationary filter element is disposed in the stationary skeleton 8. The housing 7 is provided with a vent hole 12 for discharging clean gases and an oil discharging hole 13 for the separated lubricating oil flowing back to an oil pan.

It is to be noted that, in the oil-gas separator assembly according to the present application, in the process of separating oil from gas, the oil-gas mixture first enters the rotating separating section to be separated, and then enters the stationary filtering section to be separated. The outer side of the rotating member 3 specifically refers to a side, where the oil-gas mixture reaches firstly, of the rotating member 3, and the inner side of the rotating member 3 specifically refers to another side, where the oil-gas mixture reaches secondly, of the rotating member 3.

Referring to FIG. 1, the working principle of the oil-gas separator assembly according to the present application is as follows.

The oil absorption process is that: the rotating skeleton 1, the rotating filter element 2, the connecting pipe 5 and the rotating impeller 4 are rotated synchronously as the rotating member 3 rotates. Under the action of the rotating impeller 4, a negative pressure will be generated in the oil-gas separator assembly, and the oil-gas mixture will enter the oil-gas separator assembly from an end of the rotating skeleton 1. Large oil droplets in the oil-gas mixture will be absorbed by the rotating filter element 2 first, and then the oil-gas mixture passes through the through hole in the rotating member 3 and then keeps moving on till reaching the stationary filtering section. Small oil droplets in the oil-gas mixture will be absorbed by the stationary filter element, and the residual clean gas will be discharged from the vent hole 12.

The oil flowing back process is that: the rotating filter element 2 throws away the oil absorbed therein by a centrifugal force generated by the rotation, and this part of oil will flow, in a manner of splashing, back to the oil pan. The stationary filter element discharges the separated oil droplets to the oil pan via the oil discharging hole.

Since the rotating impeller 4 generates a negative pressure during rotation, the oil-gas mixture is suctioned into the oil-gas assembly. The negative pressure generated by the rotation of the impeller sufficiently overcomes the resistances provided by the rotating separating section and the stationary filtering section, which may therefore not cause an increased gas pressure in the crankcase, thereby effectively avoiding oil leakage of the crankcase. Further, a multi-stage combination of the rotating separating and the stationary filtering also makes the effect of oil-gas separation better. The rotating filter element 2 may throw away the absorbed lubricating oil under the action of the centrifugal force, which achieves self-cleaning, and the stationary filter element is arranged downstream of the rotating filter element 2, which absorbs a small amount of lubricating oil. The two filter elements are not required to be replaced frequently. Therefore, the oil-gas separator according to the present application effectively prolongs the service life of the filter element.

It is to be easily understood that, if one stationary skeleton 8 disposed therein with a stationary filter element is provided in the stationary filtering section, the stationary filtering section and the rotating separating section form a two-stage oil-gas separating system. If multiple stationary skeletons 8, each of which is disposed therein with a stationary filter element, are provided in the stationary filtering section, the stationary filtering section and the rotating separating section may form a multiple-stage oil-gas separating system. On the premise that an installation space and manufacturing cost are permitted, multiple stationary skeletons 8 may be provided in the stationary filtering section, and each of the stationary skeletons 8 is provided therein with a stationary filter element, which further enhances the oil-gas separating effect, and improves the cleanness of the gas emissions.

It may be appreciated that, the vent hole may be provided as one vent hole or multiple vent holes. As shown in FIG. 1, multiple vent holes are distributed throughout the circumference of the housing. Further, for avoiding clean gases from being mixed into the lubricating oil again when being discharged, the vent holes 12 are preferably arranged on an upper part of the housing 7. Since the density of the lubricating oil is larger than the density of gases and the separated lubricating oil is located at the bottom of the housing 7, that discharging gas from the upper part of the housing 7 effectively avoids a re-mixing of the gases and the lubricating oil, thereby effectively avoiding the cleaning gases from being mixed into the lubricating oil again.

In fact, the oil-gas separator assembly may be generally mounted into a crankcase of an internal combustion engine. The gas pressure in the crankcase is required to be maintained within a specified range. A too high or too low gas pressure may both adversely affect the internal combustion engine. Accordingly, the oil-gas separator assembly is further optimized in an embodiment of the present application, which allows the oil-gas separator assembly to also have the function of regulating the gas pressure in the crankcase. Specifically, a pressure regulating valve is provided in the housing 7, as shown in FIG. 1. The pressure regulating valve 11 can regulate the gas pressure in the housing, which allows the gas pressure in the housing to be always in a predetermined range. The pressure regulating valve may be a conventional regulating valve available in the market, and since an internal structure of the pressure regulating valve has been known to the person skilled in the art, the internal structure of the pressure regulating valve is not described in the embodiment of the present application. It is to be easily understood by the person skilled in the art that the predetermined range of the pressure of exhausted gas may be set according to an optimized gas pressure of a crankcase. For different internal combustion engines, since their crankcases have different optimum working pressures, the emission pressures of the pressure regulating valves 11 are also required to be set differently.

Since the oil-gas mixture passes through the stationary filtering section and the oil liquid in the mixture will be absorbed by the stationary filter element and will drop to a direct lower side of the stationary filtering section under the action of gravity, the oil discharging hole 13 is arranged right below the stationary skeleton 8 for discharging the lubricating oil completely in this embodiment, as shown in FIG. 1. Further, for allowing the lubricating oil absorbed at other positions in the housing 7 to be collected to the position of the oil hole 13, an oil groove 9 for temporarily storing lubricating oil may be further provided between the stationary skeleton 8 and the oil discharging hole 13.

In the case that the oil-gas separator assembly is arranged in the crankcase, it is particularly required to prevent the gas in the crankcase from entering an interior of the oil-gas separator assembly via the oil discharging hole 13. The gases flowing into the interior of the oil-gas separator assembly may adversely affect the airflow in the oil-gas separator assembly, and cause turbulence of the airflow in the oil-gas separator and fail to achieve an idea oil-gas separation. Upon this, in this embodiment, a one-way valve 10 is provided at the oil discharging hole 13. The one-way valve 10 simply allows oil liquid to flow out of the oil discharging hole 13, while in a reverse direction, the one-way valve has a property of cutting off. Therefore, the one-way valve may avoid gas from entering the interior of the oil-gas separator assembly via the oil discharging hole 13. When the oil in the oil groove 9 reaches a certain height, the one-way valve 10 is opened by the action of the pressure of the oil, and the separated oil directly flows back to an oil pan. When an oil amount in the oil groove 9 is reduced to a certain degree, the pressure is lowered, and the one-way valve 10 is closed.

The housing 7 of the stationary filtering section is required to be reliably mounted to a body of the internal combustion engine, and the rotating separating section is rotatable with respect to the housing 7 of the stationary filtering section. Upon this, in this embodiment, a skeleton oil seal 6 is employed to seal the rotating separating section and the housing 7 of the stationary filtering section. The skeleton oil seal 6 can ensure a relative movement between the rotating separating section and the housing 7 of the stationary filtering section in one aspect, and can avoid a mutual interference between the gas in the oil-gas separator and the gas out of the oil-gas separator in another aspect.

In practical manufacturing, the stationary filter element is preferred to have a high compactness than the rotating filter element 2 so as to ensure the filtering effect.

An internal combustion engine is further provided according to the present application, which is provided with an oil-gas separator assembly in communication with a crankcase, and the oil-gas separator assembly is the oil-gas separator assembly according to any one of the above embodiments.

Due to the employment of the oil-gas separator assembly, the internal combustion engine correspondingly has the technical advantages of the oil-gas separator assembly, which are not described further herein.

The oil-gas separator assembly is preferably arranged in a gearbox of the internal combustion engine, for example, and a gear originally existed in the gear box may just serve as the rotating member. Thus, a smooth back flowing of the lubricating oil may be achieved simply by the internal structure of the oil-gas separator assembly without additionally providing an outer connecting pipe.

It is particularly noted that, the internal combustion engine in the present application includes but is not limited to a diesel engine and a gasoline engine.

The oil-gas separator assembly and the internal combustion engine according to the present application are described in detail hereinbefore. The principle and the embodiments of the present application are illustrated herein by specific examples. The above description of examples is only intended to facilitate the understanding of the method and concept of the present application. It should be noted that, for the person skilled in the art, many modifications and improvements may be made to the present application without departing from the principle of the present application, and these modifications and improvements are also deemed to fall into the scope of the present application defined by the claims.

The invention claimed is:

1. An oil-gas separator assembly, comprising:
    a rotating separating section, and
    a stationary filtering section,
        wherein the rotating separating section comprises:
            a rotating member provided with a through hole for an oil-gas mixture passing through;
            a rotating skeleton fixedly arranged at an outer side of the rotating member, wherein a rotating filter element is provided in the rotating skeleton for being rotated along with the rotating skeleton;
            a connecting pipe fixedly connected to an inner side of the rotating member; and
            a rotating impeller fixedly connected to the rotating member and located in the connecting pipe, wherein the rotating impeller is provided for suctioning the oil-gas mixture into the oil-gas separator assembly and allowing the oil-gas mixture to pass through the oil-gas separator assembly, and
        wherein the stationary filtering section comprises:
            a housing fitted with the connecting pipe in a sealed manner;
            a stationary skeleton arranged in the housing, wherein a stationary filter element is provided in the stationary skeleton; and
            a vent hole provided on the housing, and an oil discharging hole provided at the bottom of the housing.

2. The oil-gas separator assembly according to claim 1, wherein a plurality of stationary skeletons is provided in the stationary filtering section, and the stationary skeleton filter element is provided in each of the stationary skeletons.

3. The oil-gas separator assembly according to claim 1, wherein the vent hole is arranged on an upper part of the housing.

4. The oil-gas separator assembly according to claim 3, further comprising a pressure regulating valve arranged on the housing for regulating gas pressure in the housing and maintaining the gas pressure in the housing within a predetermined range.

5. The oil-gas separator assembly according to claim 1, wherein the oil discharging hole is arranged right below the stationary skeleton.

6. The oil-gas separator assembly according to claim 5, wherein an oil groove for temporarily storing lubricating oil is provided between the stationary skeleton and the oil discharging hole.

7. The oil-gas separator assembly according to claim 6, further comprising a one-way valve arranged at the oil discharging hole and simply allowing oil liquid to flow out of the oil discharging hole.

8. The oil-gas separator assembly according to claim 1, wherein the connecting pipe is fitted with the housing in a sealed manner by a skeleton oil seal.

9. An internal combustion engine, comprising:
    the oil-gas separator assembly, according to claim 1, in communication with a crankcase.

10. An internal combustion engine, comprising:
    the oil-gas separator assembly, according to claim 2, in communication with a crankcase.

11. An internal combustion engine, comprising:
    the oil-gas separator assembly, according to claim 3, in communication with a crankcase.

12. An internal combustion engine, comprising:
    the oil-gas separator assembly, according to claim 4, in communication with a crankcase.

13. An internal combustion engine, comprising:
    the oil-gas separator assembly, according to claim 5, in communication with a crankcase.

14. An internal combustion engine, comprising:
    the oil-gas separator assembly, according to claim 6, in communication with a crankcase.

15. An internal combustion engine, comprising:
    the oil-gas separator assembly, according to claim 7, in communication with a crankcase.

16. An internal combustion engine, comprising:
    the oil-gas separator assembly, according to claim 8, in communication with a crankcase.

17. The internal combustion engine according to claim 9, wherein the oil-gas separator assembly is arranged in a gearbox of the internal combustion engine, and the rotating member is a gear in the gearbox.

* * * * *